United States Patent [19]

Hattori et al.

[11] Patent Number: 5,432,232
[45] Date of Patent: Jul. 11, 1995

[54] RUBBER COMPOSITIONS

[75] Inventors: Iwakazu Hattori; Toshihiro Tadaki; Tatsuro Hamada; Fuji Yamanaka, all of Tokyo, Japan

[73] Assignees: Japan Synthetic Rubber Co., Ltd.; Bridgestone Corporation, both of Tokyo, Japan

[21] Appl. No.: 105,067

[22] Filed: Aug. 12, 1993

[30] Foreign Application Priority Data

Aug. 17, 1992 [JP] Japan .................. 4-217688

[51] Int. Cl.⁶ .............. C08L 53/02; C08L 9/00; C08L 9/06
[52] U.S. Cl. ..................... 525/99; 525/89; 525/901
[58] Field of Search .............. 525/237, 89, 99, 901

[56] References Cited

U.S. PATENT DOCUMENTS

| 4,130,606 | 12/1978 | Ballegooijen et al. | |
| 4,526,934 | 7/1985 | Oshima et al. | 525/99 |
| 4,918,142 | 4/1990 | Saito et al. | 525/99 |
| 5,194,485 | 3/1993 | Kikuchi et al. | 525/236 |
| 5,232,987 | 8/1993 | Sakakibara et al. | 525/99 |

FOREIGN PATENT DOCUMENTS

| 0502728 | 9/1992 | European Pat. Off. |
| 61-231016 | 10/1986 | Japan |
| 63-101440 | 5/1988 | Japan |
| 64-16845 | 1/1989 | Japan |
| 2158076 | 11/1985 | United Kingdom |

Primary Examiner—Carman J. Seccuro, Jr.
Attorney, Agent, or Firm—Sughrue, Mion, Zinn, Macpeak & Seas

[57] ABSTRACT

A rubber composition satisfying wear resistance and fracture properties as well as wet skid resistance, ice skid resistance and dry gripping property is provided by including at least 30% by weight of a rubber ingredient which consists of 100 parts by weight of a particular branched styrene-butadiene copolymer (A) and 15–100 parts by weight of a particular low molecular weight butadiene polymer (B) and has a Mooney viscosity of 30–100.

3 Claims, 2 Drawing Sheets

FIG_1

FIG. 2

RUBBER COMPOSITIONS

BACKGROUND OF THE INVENTION

1. Field of the Invention

This invention relates to a rubber composition for use in a tread of high running-performance pneumatic tire, and more particularly to a rubber composition for use in a tread of a high running-performance pneumatic tire having good wear resistance and fracture properties and excellent wet skid property, ice skid property and dry gripping property by including a low molecular weight butadiene polymer as a rubber ingredient.

2. Description of the Related Art

Recently, the demand on a high-speed running stability of a vehicle becomes severer and hence a rubber material for use in a tread of a tire is strongly required to have excellent wet skid resistance, ice skid resistance and dry gripping property in addition to fracture properties such as wear resistance and the like required from the old time.

However, it is difficult to simultaneously satisfy these properties, and particularly the wet skid resistance, ice skid resistance, dry gripping property and fracture properties are conflicting with each other.

In order to solve such a problem, there have hitherto been proposed various block copolymers as a rubber composition satisfying the above properties at a wide temperature range.

For example, rubber compositions using a block copolymer between high Tg polymer and low Tg polymer such as a block copolymer between styrene-butadiene copolymer having a high bound styrene content and styrene-butadiene copolymer having a low bound styrene content, a block (co)polymer between styrene-butadiene copolymer having a high vinyl content and (styrene) butadiene (co)polymer having a low vinyl content, or the like are disclosed in Japanese Patent laid open No.57-92014, No. 57-200413, No.61-55135, No.61-141742, No.61-231016, No. 62-240347, No.63-112648, No. 63-137945, No. 63-90522 and No.1-297412 and Japanese patent Application Publication No.63-60768, No.63-60769, No.63-39015 and No. 3-80165 and the like.

In these rubber compositions, it is attempted to improve the wet skid resistance, ice skid resistance and low fuel consumption by widening the Tg range of the polymer, but the dry gripping property largely exerting on the running stability at high speeds is not yet sufficient.

Further, a rubber composition obtained by adding a process oil to the block polymer between high Tg polymer and low Tg polymer, and a rubber composition obtained by coupling the high Tg polymer with the low Tg polymer and adding a process oil thereto are disclosed In Japanese Patent Application Publication No. 49-37415, Japanese Patent laid open No. 62-143959 and the like.

These rubber compositions aim at the improvement of ride comfortability as a tire for a vehicle or vibration damping properties as industrial products, but the wear resistance, fracture properties, wet skid resistance and ice skid resistance as the tire for the vehicle are still insufficiently satisfied.

Moreover, rubber compositions aiming at the improvement of processability, low fuel consumption, fracture properties and gripping force by blending high polymer with low polymer are disclosed in Japanese Patent Application Publication No. 59-52664 and Japanese Patent laid open No. 58-147442, No. 58-147443, No. 60-240746, No. 61-203145, No. 62-135506, No. 64-16845 and the like. However, the wet skid resistance, ice skid resistance, dry gripping property and wear resistance are still insufficiently satisfied.

In Japanese Patent laid open No. 1-197541 is disclosed a rubber composition aiming at the improvement of dry gripping property and wear resistance by widening Tg range of a high polymer and adding a low polymer thereto. However, the polymer for this composition is a styrene-butadiene copolymer obtained by emulsion copolymerization, so that the improvement of ice skid resistance is insufficient.

SUMMARY OF THE INVENTION

It is, therefore, an object of the invention to provide a novel rubber composition satisfying wear resistance and fracture properties as well as wet skid resistance, ice skid resistance and dry gripping property as a tire for a vehicle requiring high-speed running stability of the vehicle.

According to the invention, there is the provision of a rubber composition containing at least 30% by weight of rubber ingredient which consists of 100 parts by weight of a branched styrene-butadiene copolymer (A) satisfying the following conditions and 15–100 parts by weight of a low molecular weight butadiene polymer (B) satisfying the following conditions and has a Mooney viscosity ($ML_{1+4}$, $100°$ C.) of 30–100, said branched styrene-butadiene copolymer (A) being a branched styrene-butadiene copolymer having a bound styrene content of 15–50% by weight, a content of vinyl bond in butadiene portion of 20–70% and a weight average molecular weight (Mw) of 600,000–3,000,000 as measured by a gel permeation chromatography (GPC), at least 30% of which copolymer being coupled with a coupling agent having 2–6 functionalities; and said low molecular weight butadiene polymer (B) being a polymer having a bound styrene content of 0–60% by weight, a content of vinyl bond in butadiene portion of 20–70%, a glass transition temperature (Tg) of not lower than $-45-°$ C. as measured by means of a differential scanning calorimeter (DSC) and a weight average molecular weight (Mw) of 2,000–50,000.

In a preferable embodiment of the invention, a block copolymer consisting of a block copolymer component (A-1) having Tg of not lower than $-30-°$ C. and a block copolymer component (A-2) having Tg of not higher than $-40°$ C. is used as the copolymer (A).

BRIEF DESCRIPTION OF THE DRAWINGS

The invention will be described with reference to the accompanying drawings, wherein.

DESCRIPTION OF THE PREFERRED EMBODIMENTS

Figure 1:
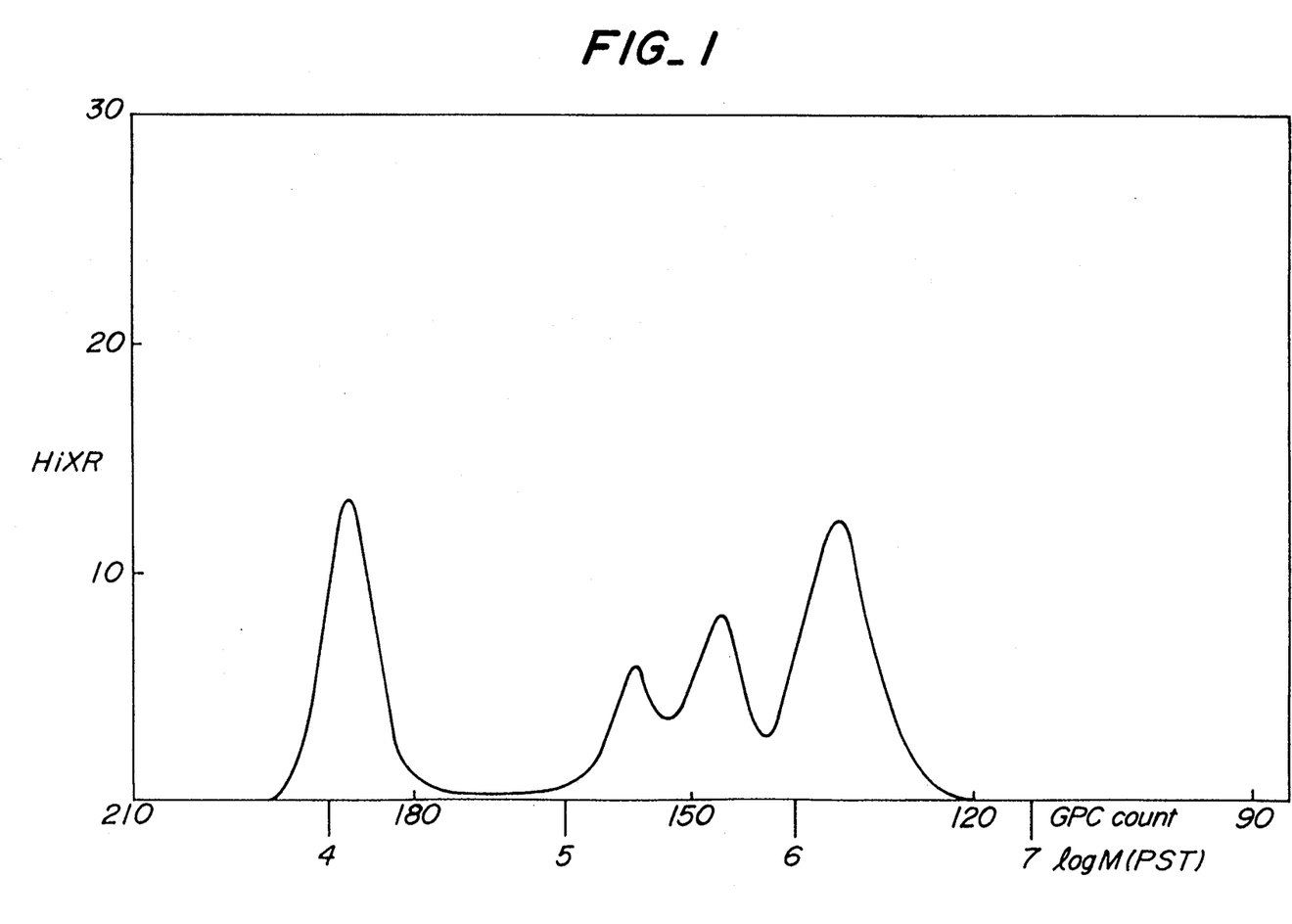
FIG. 1 is a graph of GPC curve in polymer C obtained by blending copolymer (A)-1 with copolymer (B)-1 at a weight ratio of 100:40.
Figure 2:
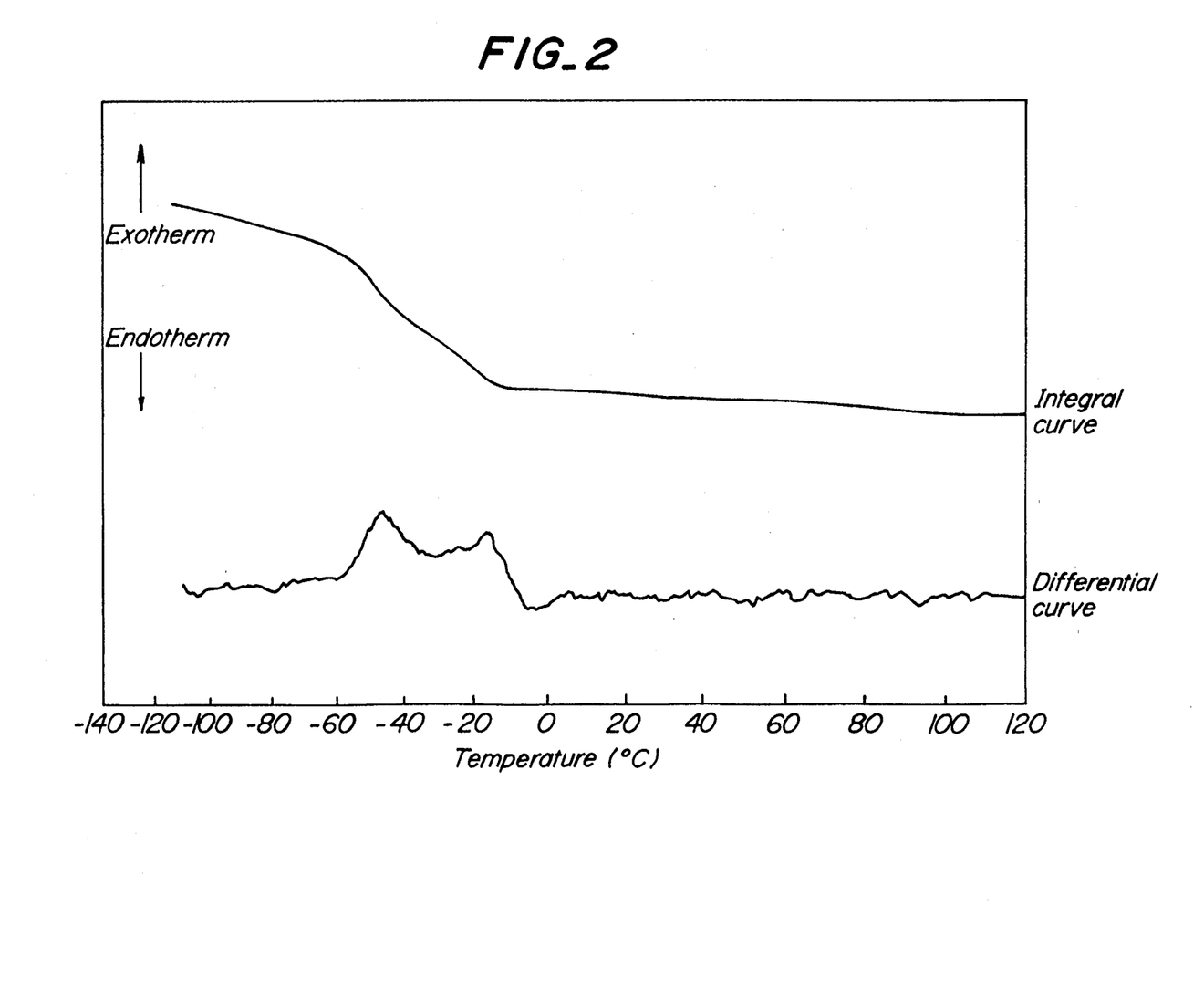
FIG. 2 is a DSC curve of the polymer C in which exotherm and endotherm are represented by integral curve and differential curve, respectively.

The branched styrene-butadiene copolymer (A) according to the invention is obtained by copolymerizing butadiene and styrene in a hydrocarbon solvent in the presence of ether or tertiary amine using a polymerization initiator and then subjecting to a coupling reaction.

In the production of the copolymer (A), a conjugated diene having a carbon number of 4–5 such as isoprene, piperylene or the like may be added to butadiene at an amount of not more than 10% by weight, and further an aromatic vinyl compound such as α-methylstyrene, vinyl toluene, methoxystyrene, t-butoxystyrene or the like may be added to styrene at an amount of not more than 10% by weight.

As the hydrocarbon solvent, mention may be made of alicyclic hydrocarbons such as cyclohexane, methyl cyclopentane, cyclooctane and the like; aliphatic hydrocarbons such as propane, butane, pentane, hexane, heptane, octane, decane and the like; and aromatic hydrocarbons such as benzene, toluene, ethylbenzene and the like.

These hydrocarbons may be used alone or in admixture. Among them, aliphatic hydrocarbons and alicyclic hydrocarbons are preferable as a polymerization solvent. The hydrocarbon solvent is used in an amount of 0.5–20 parts by weight per 1 part by weight of a monomer.

As the polymerization initiator, the use of organolithium compounds is preferable. As the organolithium compound, mention may be made of alkyl lithiums such as ethyllithium, propyllithium, n-butyllithium, sec-butyllithium, tert-butyllithium and the like; aryllithiums such as phenyllithium, tolyllithium and the like; alkenyllithiums such as vinyllithium, propenyllithium and the like; alkylene dilithiums such as tetramethylene dilithium, pentamethylene dilithium, hexamethylene dilithium, decamethylene dilithium and the like; arylene dilithiums such as 1,3-dilithiobenzene, 1,4-dilithiobenzene and the like; 1,3,5-trilithiocyclohexane, 1,2,5-trilithionapthalene, 1,3,5,8-tetralithiodecane, 1,2,3,5-tetralithio-4-hexyl anthracene and the like.

Among them, n-butyllithium, sec-butyllithium, tert-butyllithium and tetramethylene dilithium are preferable, and particularly the use of n-butyllithium is favorable.

The amount of the organolithium compound to be used is determined by a given polymerization rate in the reaction operation and a molecular weight of the resulting polymer, but is usually about 0.02–5 milligram atom, preferably about 0.05–2 milligram atom as a lithium atom per 100 g of the monomer.

According to the invention, it is preferable that the organolithium compound is used together with a potassium compound as the polymerization initiator. An example of the potassium compound is a compound having —OK, >NK, —SO$_3$K or —OSO$_3$ group.

As the compound having —OK group, mention may be made of methoxy potassium, ethoxy potassium, n-butoxy potassium, 2-ethylhexylxy potassium, n-phenoxy potassium and the like.

As the compound having >NK group, mention may be made of potassium salts of diethylamine, dibutylamine, ethylphenylamine and diphenylamine.

As the compound having —SO$_3$K or —OSO$_3$ group, mention may be made of potassium dodecylbenzene sulfonate, potassium tetradecylbenzene sulfonate, potassium hexadecylbenzene sulfonate, potassium octadecylbenzene sulfonate and the like as disclosed in Japanese Patent Application Publication No. 54-44315.

The potassium compound is preferably used in an amount of 0.05–0.5 mol per 1 gram atom equivalent of lithium in the organolithium compound.

When the amount of the potassium compound is less than 0.05 mol per 1 gram atom equivalent of lithium, it is difficult to obtain random styrene-butadiene copolymer, while when it exceeds 0.5 mol, the polymerization activity lowers.

Moreover, the potassium compound may be used in an admixture with a polar compound. As the polar compound, mention may be made of aliphatic alcohols such as methyl alcohol, n-butyl alcohol, t-butyl alcohol, hexyl alcohol, 2-ethylhexyl alcohol, n-octyl alcohol, lauryl alcohol and the like; various phenolic alcohol derivatives; primary and secondary amines such as butylamine, dibutylamine, hexylamine, dihexylamine, octylamine, dioctylamine, benzylamine, dibenzylamine, aniline and the like; thioalcohols such as butyl mercaptane, octyl mercaptane, dodecyl mercaptane and the like; organic carboxylic acids such as octylic acid, stearic acid, hexanoic acid and the like; organic phosphorous acids and organic sulfonic acids.

Among these polar compounds, alcohols having a carbon number of not less than 4 and secondary amines are preferable in order to obtain styrene-butadiene copolymers having good properties, particularly rebound resilience and wear resistance and from a viewpoint that a tendency of lowering polymerization activity is small.

The polymerization reaction for the production of the copolymer (A) may be conducted by anyone of batch system or continuous system.

In this case, the polymerization temperature is preferably within a range of 0° C. to 130° C.

Further, the polymerization reaction may be isothermal polymerization, polymerization under heating or adiabatic polymerization.

In order to prevent the formation of gel inside a reaction vessel during the polymerization, an allene compound such as 1,2-butadiene or the like may be added.

According to the invention, a branched styrene-butadiene copolymer having a bound styrene content of 15–50% by weight and a content of vinyl bond in butadiene portion of 20–70% is used as the copolymer (A).

When the bound styrene content is less than 15% by weight, the fracture properties lower and it is difficult to simultaneously satisfy the wet skid resistance and other properties, while when it exceeds 50% by weight, the ice skid resistance and wear resistance lower.

Furthermore, when the content of vinyl bond is less than 20%, the wet skid resistance is insufficient, while when it exceeds 70%, the ice skid resistance lowers.

The copolymer (A) used in the invention has a weight average molecular weight (Mw) of 600,000–3,000,000, preferably 700,000–2,500,000 as a polystyrene conversion measured by GPC.

When the weight average molecular weight (Mw) of the copolymer (A) is less than 600,000, the fracture properties lower, while when it exceeds 3,000,000, the viscosity of the polymerization solution becomes too high and the productivity is degraded.

According to the invention, not less than 30%, preferably 40–80% of the resulting copolymer (A) is coupled by adding a coupling agent having 2–6 functionalities after the above polymerization reaction.

When the coupling ratio of the copolymer (A) is less than 30%, the fracture properties, ice skid resistance and processability are poor.

As the coupling agent having 2–6 functionalities, mention may be made of alkenyl aromatic compounds such as divinyl benzene, diisopropenyl benzene and the like; halogenated tin compounds such as tin tetrachloride, dibutyl tin dichloride, butyl tin trichloride, phenyl tin trichloride, diphenyl tin dichloride and the like; halogenated silicon compounds such as silicon tetrachloride, butyl trichlorosilicon, methyl trichlorosilicon and the like; isocyanate derivatives such as 2,4-tolylene diisocyanate, 2,6-tolylene diisocyanate, diphenylmethane diisocyanate, polymeric-type diphenylmethane diisocyanate, isophorone diisocyanate, hexamethylene diisocyanate and the like; and aromatic nitrogen-containing heterocyclic compounds such as 4-vinylpyridine, 2-vinylpyridine, bis(2-pyridyl)ketone, bis(4-pyridyl)ketone and the like. Among them, the coupling agents having 3-4 functionalities are preferable, and particularly the use of the halogenated silicon compound is favorable.

These coupling agents may be added to the polymerization system alone or in admixture.

Preferably, the copolymer (A) used in the invention is a block copolymer consisting of a block copolymer component (A-1) having Tg of not lower than −30° C., preferably −30° C. to 0° C. and a block copolymer component (A-2) having Tg of not higher than −40° C., preferably −40° C. to −90° C.

The block copolymer component (A-1) having Tg of not lower than −30° C. can be obtained when the content of vinyl bond in the block copolymer component (A-1) is not less than about 68% in case of the bound styrene content of 20% by weight, not less than about 55% in case of the bound styrene content of 30% by weight, not less than about 40% in case of the bound styrene content of 40% by weight, and not less than about 30% in case of the bound styrene content of 45% by weight.

The block copolymer component (A-2) having Tg of not higher than −40° C. can be obtained when the content of vinyl bond in the block copolymer component (A-2) is not more than about 70% in case of the bound styrene content of 10% by weight, not more than about 55% in case of the bound styrene content of 20% by weight, and not more than about 45% in case of the bound styrene content of 30% by weight.

Moreover, the block copolymer component (A-2) is preferable to have a bound styrene content of not less than 3% by weight from a viewpoint of the balance in properties to the block copolymer component (A-1).

The polymers having the aforementioned microstructure [block copolymer component (A-1) and block copolymer component (A-2)] can be obtained by using an organometal compound composed mainly of the above organolithium compound as a catalyst. That is, it is possible to produce the desired copolymer components (A-1) and (A-2) by using the above catalyst.

The molecular weight of the copolymer (A) is not critical, but it is preferably a molecular weight corresponding to Mooney viscosity ($ML_{1+4, 100°\ C.}$) of 50-200.

When the Mooney viscosity is less than 50 the wear resistance, fracture properties and dry gripping property as a rubber composition lower and also the surface tackiness becomes too large to lower the productivity, while when it exceeds 200, the kneading property with other rubber and carbon black as a rubber composition and the productivity lower.

In the copolymer (A) consisting of the block copolymer components (A-1) and (A-2), there are multiblock type copolymer components such as (A-1)-(A-2)-(A-1), (A-2)-(A-1)-(A-2), (A-1)-(A-2)-(A-1)-(A-2) and the like, which may be coupled.

According to the invention, branched styrene-butadiene copolymers (A) as mentioned below can also be obtained by using the coupling agent of 2-6 functionalities as a coupling agent:

$[(A-1)-(A-2)]_n-Z$ $[(A-2)-(A-1)]_n-Z$ $[(A-1)-(A-2)-(A-1)]_n-Z$ $[(A-2)-(A-1)-(A-2)]_n-Z$ $[(A-1)-(A-2)-(A-1)-(A-2)]_n-Z$ $[(A-2)-(A-1)-(A-2)-(A-1)]_n-Z$ wherein n is an integer of 2-6 and Z is a residue of the coupling agent of 2-6 functionalities.

Among these copolymers, a copolymer in which the terminal portion of the polymer is the block (A-1) such as $[(A-1)-(A-2)]_n-Z$ is preferable.

The low molecular weight butadiene polymer (B) can be produced in the same manner as in the production of the copolymer (A).

Furthermore, the microstructure of the polymer (B) can be controlled by the same method as in the copolymer (A).

The low molecular weight butadiene polymer (B) has a microstructure that the bound styrene content is 0-60% by weight, the content of vinyl bond in butadiene portion is 20-70% and Tg is not lower than −45° C.

When the bound styrene content exceeds 60% by weight, the ice skid resistance lowers.

When the content of vinyl bond in butadiene portion is less than 20%, the wet skid resistance and dry gripping property lower, while when it exceeds 70%, the polymer becomes resinous and rigid and hence the wet skid resistance and dry gripping property are degraded.

When Tg is lower than −45° C., the wet skid resistance and dry gripping property are poor. Preferably, Tg is −45° C. to −10° C.

A rubber composition satisfying strength and dry gripping property can be provided by using such a polymer (B).

Moreover, the low molecular weight butadiene polymer (B) has a weight average molecular weight (Mw) of 2,000-50,000 as measured by GPC.

When the weight average molecular weight (Mw) is less than 2,000, the fracture properties, wear resistance, wet skid resistance and dry gripping property are poor, while when it exceeds 50,000, the wet skid resistance and dry gripping property are poor.

The weight average molecular weight of the polymer (B) can be controlled by varying an amount of organolithium compound to be added. In general, the organolithium compound is used in an amount of 3-100-milligram, preferably 5-50 milligram as a lithium atom per 100 g of the monomer.

The low molecular weight butadiene polymer (B) is added to the branched styrene-butadiene copolymer (A) in an amount of 15-100 parts by weight, preferably 20-80 parts by weight based on 100 parts by weight of the copolymer (A).

When the amount of the polymer (B) is less than 15 parts by weight, the improvement of strength and dry gripping property is insufficient, while when it exceeds 100 parts by weight, the Mooney viscosity becomes too low and the productivity is degraded.

According to the invention, the Mooney viscosity ($ML_{1+4, 100° C.}$) after the addition of the polymer (B) to the copolymer (A) is 30–100, preferably 35–80.

When the Mooney viscosity is less than 30, the surface tackiness becomes too large to lower the productivity, while when it exceeds 100, the kneading property with other rubber and carbon black as a rubber composition and the productivity lower.

In the invention, a polymerization reaction solution containing styrene-butadiene copolymer is obtained by adding a polymerization solution of the polymer (B) to a polymerization solution of the copolymer (A), or by polymerizing the copolymer (A) and then adding butadiene or a mixture of styrene and butadiene with the organolithium compound to polymerize the low molecular weight polymer (B). This solution can be subjected to a method usually used in the solution polymerization (e.g. a method in which a stabilizer or the like is added at a solution state and then direct drying or steam stripping is conducted), whereby rubber ingredient and solvent are separated and then washing and drying are conducted to obtain a rubber ingredient according to the invention.

The rubber composition according to the invention contains at least 30% by weight of the above rubber ingredient consisting of the branched styrene-butadiene copolymer (A) and the low molecular weight butadiene polymer (B). The rubber ingredient is used alone or is blended with natural rubber, polyisoprene rubber, emulsion polymerized styrene-butadiene rubber, polybutadiene or the like, which is added with a reinforcing material such as carbon black or silica and various additives and kneaded by means of rolls, Banbury mixer, kneader or the like, added with sulfur, vulcanization accelerator and the like and then cured to manufacture a rubber article for a tire such as tread, sidewall, carcass or the like as well as belts, vibration damping rubber and other industrial goods.

When the rubber composition according to the invention is blended with emulsion polymerized styrene-butadiene rubber, it is particularly suitable for high-speed running type tires, while when being blended with polybutadiene, it is particularly suitable for tires having good low-temperature properties.

The following examples are given in illustration of the invention and are not intended as limitations thereof.

In these examples, various properties are evaluated by the following methods.

(1) Mooney Viscosity

It is measured according to a method described in JIS K6300 (test item (1), test of Mooney viscosity) using L-rotor.

(2) Molecular Weight (Mw) and Molecular Weight Distribution (Mw/Mn)

They are measured by means of 244 model GPC made by Waters Corp. using a differential refractometer as a detector under the following conditions:
  column: GMH-3, GMH-6, G6000H-6 columns made by Toyo Soda Mfg. Co., Ltd.
  mobile phase: tetrahydrofuran (3) Molecular Weight Converted into Polystyrene A monodisperse styrene polymer made by Waters Corp. is used and a relationship between molecular weight at a peak of the monodisperse styrene polymer through GPC and count number of GPC is measured to prepare a calibration curve, from which a molecular weight of a polymer converted into polystyrene is determined.

(4) Ratio of Coupled Branched Copolymer

It is determined from a ratio of area at a peak side a highest molecular weight to whole area in a curve of molecular weight distribution through GPC.

(5) Glass Transition Temperature (Tg)

It is measured by using a differential scanning calorimeter of 910 Model (DSC) made by DuPont de Nemours & Co. according to a method described in ASTM D3418–82 to determine an extrapolated onset temperature Tf as a value of Tg.

(6) Properties After Vulcanization

① Tensile strength

It is measured according to JIS K6301.

② tan δ

It is measured at a dynamic strain of 1% and 100 Hz by means of a spectrometer made by Iwamoto Seisakusho.

③ Wet skid and ice skid

They are evaluated by means of a skid tester on a wet road surface and ice.

④ Lambourn abrasion

It is evaluated by means of a Lambourn abrasion testing machine.

Synthetic Example 1

<Synthesis of branched styrene-butadiene copolymer (A)-I>

Into an autoclave of 5 liter, sufficiently purged with nitrogen and provided with stirring blades are charged 3000 g of cyclohexane, 12 g of tetrahydrofuran (THF), 140 g of 1,3-butadiene and 110 g of styrene, and then a temperature inside the autoclave is adjusted to 21° C.

Next, 0.0167 g of a 2:1 complex of potassium dodecylbenzene sulfonate and 2-ethylhexyl alcohol and 0.19 g of n-butyllithium are added, which is polymerized under a temperature raising conditions for 15 minutes. It is confirmed that a conversion of monomers is 99%.

To this polymerization system are further added 222 g of 1,3-butadiene and 28 g of styrene, which is polymerized under temperature raising conditions for 20 minutes.

Then, 0.133 g of silicon tetrachloride as a coupling agent is added to conduct coupling reaction for 10 minutes and thereafter 3.5 g of 2,6-di-t-butyl-p-cresol is added as an antioxidant.

<Synthesis of low molecular weight butadiene polymer (B)-I>

Into the same autoclave as mentioned above are charged 3000 g of cyclohexane, 45 g of THF, 375 g of 1,3-butadiene and 125 g of styrene, and then a temperature inside the autoclave is adjusted to 25° C., and thereafter 5.10 g of n-butyllithium is added to conduct polymerization under temperature raising conditions for 15 minutes.

After the completion of the polymerization, 2,6-di-t-butyl-p-cresol is added.

The copolymer (A)-I and the polymer (B)-I are blended at a solution state so as to have a weight ratio of 100/10 (polymer A), 100/20 (polymer B), 100/40 (polymer C), 100/60 (polymer D) or 100/110 (polymer E), and then the resulting polymer as a rubber ingredient is dried after the removal of solvent.

The analytical results of these polymers A-E are shown in Tables 1 and 2.

A polymer F is obtained adding 60 parts by weight of an aromatic oil to 100 parts by weight of the copolymer (A)-I instead of the low molecular weight butadiene polymer (B)-I.

The analytical results are shown in Tables 1 and 2.

Synthetic Example 2

<Synthesis of copolymer (A)-II>

A copolymer (A)-II is obtained by copolymerizing 1,3-butadiene and styrene without dividing monomers in the same autoclave as in Synthetic Example 1 and then conducting the same coupling reaction as in Synthetic Example 1.

The copolymer (A)-II and the polymer (B)-I obtained in Synthetic Example 1 are blended at a solution state so as to have a weight ratio of 100/40 and then subjected to solvent removal and drying, whereby a polymer G is obtained.

The analytical results are shown in Tables 1 and 2.

Synthetic Example 3

<Synthesis of copolymer (A)-III>

A copolymer (A)-III is synthesized in the same manner as in Synthetic Example 1 except that the amount of THF is increased from 12 g to 50 g in order to change the microstructure.

<Synthesis of polymer (B)-II>

A polymer (B)-II having a structure shown in Table 1 is synthesized in the same manner as in Synthetic Example 1 except that the amount of THF is changed from 45 g to 15 g and the amount of 1,3-butadiene is changed from 375 g to 275 g and the amount of styrene is changed from 125 g to 225 g.

The copolymer (A)-III and the polymer (B)-II are blended at a solution state so as to have a weight ratio of 100/60 and then subjected to solvent removal and drying, whereby a polymer H is obtained.

The analytical results are shown in Tables 1 and 2.

Synthetic Example 4

A copolymer (A)-IV and a polymer (B)-III are synthesized in the same reaction vessel by the following procedure.

Into the reaction vessel are charged 3000 g of cyclohexane, 12 g of THF, 100 g of 1,3-butadiene and 80 g of styrene, to which are added 0.14 g of n-butyllithium and 0.0120 g of the same potassium compound as in Synthetic Example 1 and then polymerization is conducted under temperature raising conditions. It is confirmed that the conversion of monomers is not less than 98%.

In this reaction vessel are further added 160 g of 1,3-butadiene and 20 g of styrene and then polymerization is conducted under temperature raising conditions. After 20 minutes, 0.072 g of silicon tetrachloride is added to conduct coupling reaction for 10 minutes.

Subsequently, 16 g of THF, 151 g of 1,3-butadiene and 65 g of styrene are added and further 5.00 g of n-butyllithium is added to conduct polymerization under temperature raising conditions from 63° C. for 15 minutes, and then 0.464 g of silicon tetrachloride is added to conduct coupling reaction.

The reaction product is added with an anti-oxidant and subjected to solvent removal and drying to obtain a polymer I.

The analytical results are shown in Tables 1 and 2.

Synthetic Example 5

<Synthesis of copolymer (A)-V>

A copolymer (A)-V is synthesized in the same manner as in Synthetic Example 1 except that the coupling agent (silicon tetrachloride) is not added in the synthesis of the branched styrene-butadiene copolymer (A)-I.

The copolymer (A)-V and the polymer (B)-I obtained in Synthetic Example 1 are blended at a solution state so as to have a weight ratio of 100/60 and then subjected to solvent removal and drying, whereby a polymer J is obtained.

The analytical results are shown in Tables 1 and 2.

Synthetic Example 6

<Synthesis of polymer (B)-IV>

A polymer (B)-IV having a structure shown in Table 2 is synthesized in the same manner as in Synthetic Example 1 except that the amount of THF is decreased from 45 g to 5 g and the polymerization starting temperature is changed from 25° C. to 45° C.

The polymer (B)-IV and the copolymer (A)-I obtained in Synthetic Example 1 are blended at a solution state so as to have a weight ratio of 60/100 and then subjected to solvent removal and drying, whereby a polymer K is obtained.

The analytical results are shown in Tables 1 and 2.

Synthetic Example 7

A copolymer (A)-IV and a polymer (B)-V are synthesized in the same manner as in Synthetic Example 4.

At first, the copolymer (A)-IV is synthesized in the same manner as in Synthetic Example 4.

Then, the polymer (B)-V is synthesized in the same manner as in Synthetic Example 4 except that the amount of n-butyllithium is changed from 5.00 g to 2.2 g without further adding 16 g of THF in the synthesis of the polymer (B)-III and the addition of silicon tetrachloride is not conducted after the polymerization.

Thereafter, the antioxidant is added and the solvent removal bad drying are conducted to obtain a polymer L.

The analytical results are shown in Tables 1 and 2.

TABLE 1(a)

| <Copolymer (A)> | Polymer-A copolymer (A)-I | Polymer-B copolymer (A)-I | Polymer-C copolymer (A)-I | Polymer-D copolymer (A)-I | Polymer-E copolymer (A)-I | Polymer-F copolymer (A)-I |
|---|---|---|---|---|---|---|
| [block copolymer component (A-1)] | | | | | | |
| microstructure vinyl content (%) | 34 | 34 | 34 | 34 | 34 | 34 |
| cis content (%) | 34 | 34 | 34 | 34 | 34 | 34 |
| trans content (%) | 32 | 32 | 32 | 32 | 32 | 32 |
| bound styrene content (%) | 44 | 44 | 44 | 44 | 44 | 44 |
| glass transition temperature (Tg) (°C.) | −25 | −25 | −25 | −25 | −25 | −25 |

TABLE 1(a)-continued

| <Copolymer (A)> | Polymer-A copolymer (A)-I | Polymer-B copolymer (A)-I | Polymer-C copolymer (A)-I | Polymer-D copolymer (A)-I | Polymer-E copolymer (A)-I | Polymer-F copolymer (A)-I |
|---|---|---|---|---|---|---|
| [block copolymer component (A-2)] | | | | | | |
| microstructure vinyl content (%) | 39 | 39 | 39 | 39 | 39 | 39 |
| cis content (%) | 30 | 30 | 30 | 30 | 30 | 30 |
| trans content (%) | 31 | 31 | 31 | 31 | 31 | 31 |
| bound styrene content (%) | 11 | 11 | 11 | 11 | 11 | 11 |
| glass transition temperature (Tg) (°C.) | −68 | −68 | −68 | −68 | −68 | −68 |
| [copolymer component (A)] | | | | | | |
| microstructure vinyl content (%) | 37 | 37 | 37 | 37 | 37 | 37 |
| cis content (%) | 32 | 32 | 32 | 32 | 32 | 32 |
| trans content (%) | 31 | 31 | 31 | 31 | 31 | 31 |
| bound styrene content (%) | 28 | 28 | 28 | 28 | 28 | 28 |
| difference in glass transition temperature between block copolymer components (ΔTg) (°C.) | 43 | 43 | 43 | 43 | 43 | 43 |
| Block copolymer component (A-1) / Block copolymer component (A-2) (weight ratio) | 1:1 | 1:1 | 1:1 | 1:1 | 1:1 | 1:1 |
| molecular weight Mw (× $10^4$) | 90.6 | 90.6 | 90.6 | 90.6 | 90.6 | 90.6 |
| molecular weight distribution Mw/Mn | 2.67 | 2.67 | 2.67 | 2.67 | 2.67 | 2.67 |
| Kind of coupling agent | $SiCl_4$ | $SiCl_4$ | $SiCl_4$ | $SiCl_4$ | $SiCl_4$ | $SiCl_4$ |
| Ratio of branched copolymer | 53 | 53 | 53 | 53 | 53 | 53 |

TABLE 1(b)

| <Copolymer (A)> | Polymer-G copolymer (A)-II | Polymer-H copolymer (A)-III | Polymer-I copolymer (A)-IV | Polymer-J copolymer (A)-V | Polymer-K copolymer (A)-I | Polymer-L copolymer (A)-IV |
|---|---|---|---|---|---|---|
| [block copolymer component (A-1)] | | | | | | |
| microstructure vinyl content (%) | — | 45 | 35 | 36 | 34 | 35 |
| cis content (%) | — | 33 | 36 | 33 | 34 | 36 |
| trans content (%) | — | 22 | 29 | 31 | 32 | 29 |
| bound styrene content (%) | — | 41 | 46 | 44 | 44 | 46 |
| glass transition temperature (Tg) (°C.) | — | −18 | −24 | −26 | −25 | −24 |
| [block copolymer component (A-2)] | | | | | | |
| microstructure vinyl content (%) | — | 52 | 42 | 39 | 39 | 42 |
| cis content (%) | — | 22 | 23 | 31 | 30 | 23 |
| trans content (%) | — | 26 | 35 | 30 | 31 | 35 |
| bound styrene content (%) | — | 11 | 12 | 11 | 11 | 12 |
| glass transition temperature (Tg) (°C.) | — | −55 | −64 | −67 | −68 | −64 |
| [copolymer component (A)] | | | | | | |
| microstructure vinyl content (%) | 38 | 49 | 39 | 38 | 37 | 39 |
| cis content (%) | 30 | 26 | 28 | 32 | 32 | 28 |
| trans content (%) | 32 | 25 | 33 | 30 | 31 | 33 |
| bound styrene content (%) | 28 | 26 | 28 | 28 | 28 | 28 |
| difference in glass transition temperature between block copolymer components (ΔTg) (°C.) | 0 | 37 | 40 | 41 | 43 | 40 |
| Block copolymer component (A-1) / Block copolymer component (A-2) (weight ratio) | — | 1:1 | 1:1 | 1:1 | 1:1 | 1:1 |
| molecular weight Mw (× $10^4$) | 92.5 | 101 | 105 | 41.9 | 90.6 | 98 |
| molecular weight distribution Mw/Mn | 1.95 | 2.27 | 2.47 | 1.51 | 2.67 | 2.46 |
| Kind of coupling agent | $SiCl_4$ | $SiCl_4$ | $SiCl_4$ | — | $SiCl_4$ | $SiCl_4$ |
| Ratio of branched copolymer | 67 | 51 | 48 | 0 | 53 | 51 |

TABLE 2(a)

| | Polymer-A | Polymer-B | Polymer-C | Polymer-D | Polymer-E | Polymer-F |
|---|---|---|---|---|---|---|
| [Low molecular weight butadiene polymer (B)] | polymer (B)-I | polymer (B)-I | polymer (B)-I | polymer (B)-I | polymer (B)-I | — |
| microstructure vinyl content (%) | 66 | 66 | 66 | 66 | 66 | — |
| cis content (%) | 16 | 16 | 16 | 16 | 16 | — |
| trans content (%) | 18 | 18 | 18 | 18 | 18 | — |
| bound styrene content (%) | 25 | 25 | 25 | 25 | 25 | — |
| glass transition temperature (°C.) | −32 | −32 | −32 | −32 | −32 | — |
| molecular weight Mw | 10500 | 10500 | 10500 | 10500 | 10500 | — |
| molecular weight distribution Mw/Mn | 1.21 | 1.21 | 1.21 | 1.21 | 1.21 | — |
| ratio of branched polymer | 0 | 0 | 0 | 0 | 0 | — |
| [Polymer consisting of copolymer (A) and polymer (B)] | | | | | | |
| ratio of polymer (B) to 100 parts by weight of copolymer (A) (parts by weight) | 10 | 20 | 40 | 60 | 110 | 0 |
| amount of aromatic oil added to copolymer (A) (parts by weight) | 0 | 0 | 0 | 0 | 0 | 60 |

TABLE 2(a)-continued

|  | Polymer-A | Polymer-B | Polymer-C | Polymer-D | Polymer-E | Polymer-F |
|---|---|---|---|---|---|---|
| Mooney viscosity (ML$_{1+4}$, 100° C.) | 105 | 89 | 59 | 40 | 23 | 41 |

TABLE 2(b)

|  | Polymer-G | Polymer-H | Polymer-I | Polymer-J | Polymer-K | Polymer-L |
|---|---|---|---|---|---|---|
| [Low molecular weight butadiene polymer (B)] | polymer (B)-I | polymer (B)-II | polymer (B)-III | polymer (B)-I | polymer (B)-IV | polymer (B)-V |
| microstructure vinyl content (%) | 66 | 37 | 47 | 66 | 30 | 33 |
| cis content (%) | 16 | 30 | 26 | 16 | 27 | 31 |
| trans content (%) | 18 | 33 | 27 | 18 | 31 | 36 |
| bound styrene content (%) | 25 | 45 | 30 | 25 | 25 | 30 |
| glass transition temperature (°C.) | −32 | −37 | −36 | −32 | −49 | −41 |
| molecular weight Mw | 10500 | 9900 | 8700 | 10500 | 9800 | 9500 |
| molecular weight distribution Mw/Mn | 1.21 | 1.33 | 1.75 | 1.21 | 1.26 | 1.66 |
| ratio of branched polymer | 0 | 0 | 35 | 0 | 0 | 0 |
| [Polymer consisting of copolymer (A) and polymer (B)] | | | | | | |
| ratio of polymer (B) to 100 parts by weight of copolymer (A) (parts by weight) | 40 | 60 | 60 | 60 | 60 | 60 |
| amount of aromatic oil added to copolymer (A) (parts by weight) | 0 | 0 | 0 | 0 | 0 | 0 |
| Mooney viscosity (ML$_{1+4}$, 100° C.) | 61 | 42 | 49 | 32 | 41 | 46 |

Examples 1–12, Comparative Examples 1–5

The polymers A-L obtained in Synthetic Examples 1–7 are mixed with natural rubber, cis-1,4-polybutadiene rubber or emulsion polymerized SBR at a mixing ratio shown in Table 3 and then compounded according to a compounding recipe shown in Table 4 (provided that the amount of aromatic oil is shown in Table 2). The resulting composition is cured at 145° C. for 30 minutes and then the properties of the vulcanizate are measured.

The measured results are shown in Table 3.

TABLE 3(a)

|  | Example 1 | Example 2 | Example 3 | Comparative Example 1 | Comparative Example 2 | Comparative Example 3 | Example 4 | Example 5 |
|---|---|---|---|---|---|---|---|---|
| Rubber ingredient | | | | | | | | |
| polymer (kind) | polymer-B | polymer-C | polymer-D | polymer-A | polymer-E | polymer-F | polymer-G | polymer-H |
| (parts by weight) | 120 | 140 | 160 | 110 | 210 | 160 | 140 | 160 |
| natural rubber (parts by weight) | 0 | 0 | 0 | 0 | 0 | 0 | 0 | 0 |
| cis-1,4-polybutadine (parts by weight) | 0 | 0 | 0 | 0 | a | 0 | 0 | 0 |
| emulsion polymerized SBR (parts by weight) | 0 | 0 | 0 | 0 | 0 | 0 | 0 | 0 |
| aromatic oil (parts by weight) | 40 | 20 | 0 | 50 | 0 | 0 | 20 | 0 |
| Properties after vulcanization | | | | | | | | |
| tensile strength (kgf/cm$^2$) | 172 | 189 | 208 | 168 | 122 | 159 | 188 | 220 |
| elongation (%) | 550 | 610 | 590 | 530 | 800 | 500 | 620 | 570 |
| tan δ at 50° C. | 0.392 | 0.408 | 0.425 | 0.375 | 0.438 | 0.368 | 0.375 | 0.434 |
| tan δ at 0° C. | 0.219 | 0.244 | 0.228 | 0.215 | 0.220 | 0.205 | 0.266 | 0.268 |
| wet skid (index) | 110 | 117 | 113 | 103 | 106 | 100 | 106 | 124 |
| ice skid (index) | 119 | 123 | 124 | 110 | 106 | 100 | 113 | 116 |
| Lambourn abrasion (index) | 119 | 130 | 135 | 105 | 62 | 100 | 127 | 136 |

TABLE 3(b)

|  | Example 6 | Example 7 | Example 8 | Example 9 | Example 10 | Example 11 | Example 12 | Comparative Example 4 | Comparative Example 5 |
|---|---|---|---|---|---|---|---|---|---|
| Rubber ingredient | | | | | | | | | |
| polymer (kind) | polymer-I | polymer-C | polymer-C | polymer-I | polymer-I | polymer-H | polymer-L | polymer-J | polymer-K |
| (parts by weight) | 160 | 70 | 70 | 80 | 80 | 80 | 160 | 160 | 160 |
| natural rubber (parts by weight) | 0 | 0 | 10 | 0 | 50 | 10 | 0 | 0 | 0 |
| cis-1,4-polybutadine (parts by weight) | 0 | 0 | 30 | 0 | 0 | 0 | 0 | 0 | 0 |
| emulsion polymerized SBR (parts by weight) | 0 | 50 | 10 | 50 | 0 | 40 | 0 | 0 | 0 |
| aromatic oil (parts by weight) | 0 | 40 | 40 | 30 | 30 | 30 | 0 | 0 | 0 |
| Properties after vulcanization | | | | | | | | | |
| tensile strength (kgf/cm$^2$) | 210 | 187 | 177 | 189 | 191 | 186 | 215 | 168 | 175 |

TABLE 3(b)-continued

|  | Example 6 | Example 7 | Example 8 | Example 9 | Example 10 | Example 11 | Example 12 | Comparative Example 4 | Comparative Example 5 |
| --- | --- | --- | --- | --- | --- | --- | --- | --- | --- |
| elongation (%) | 590 | 595 | 565 | 585 | 605 | 587 | 580 | 550 | 560 |
| tan δ at 50° C. | 0.423 | 0.395 | 0.381 | 0.391 | 0.392 | 0.385 | 0.429 | 0.418 | 0.377 |
| tan δ at 0° C. | 0.231 | 0.225 | 0.219 | 0.222 | 0.220 | 0.221 | 0.239 | 0.219 | 0.218 |
| wet skid (index) | 117 | 116 | 113 | 114 | 115 | 113 | 120 | 105 | 103 |
| ice skid (index) | 126 | 127 | 135 | 126 | 127 | 126 | 124 | 109 | 116 |
| Lambourn abrasion (index) | 134 | 136 | 136 | 135 | 130 | 129 | 132 | 95 | 106 |

TABLE 4

|  | parts by weight |
| --- | --- |
| Rubber ingredient *a | — |
| Carbon black ISAF | 60 |
| Aromatic oil *b | — |
| Stearic acid | 2 |
| Zinc white | 3 |
| Antioxidant 810NA *1 | 1 |
| Vulcanization accelerator CZ *2 | 0.6 |
| Vulcanization accelerator M *3 | 0.6 |
| Vulcanization accelerator D *4 | 0.4 |
| Sulfur | 1.5 |

*1: N-phenyl-N'-isopropyl-p-phenylene diamine
*2: N-cyclohexyl-2-benzothiazolyl sulfenamide
*3: 2-mercaptobenzothiazole
*4: 1,3-diphenyl guanidine
*a: amount shown in Table 2
*b: amount shown in Table 2

As seen from the results of Table 3, the vulcanizates of Examples 1-12 are superior in the wear resistance, fracture properties, wet skid resistance, ice skid resistance and dry gripping property to the vulcanizates of Comparative Examples 1-5.

According to the invention, rubber compositions having good wear resistance and fracture properties and excellent wet skid resistance, ice skid resistance and dry gripping property are obtained by blending the high molecular weight branched styrene-butadiene copolymer having a particular glass transition temperature with the low molecular weight butadiene polymer having a particular glass transition temperature.

These rubber compositions are suitable for a tread of a tire and are particularly excellent in the high-speed running stability recently required in the tread.

What is claimed is:

1. A rubber composition containing at least 30% by weight of rubber ingredient which consists of 100 parts by weight of a branched styrene-butadiene copolymer (A) satisfying the following conditions and 15-100 parts by weight of a low molecular weight butadiene polymer (B) satisfying the following conditions, said rubber composition having a Mooney viscosity ($ML_{1+4, 100° C.}$) of 30-100, said branched styrene-butadiene copolymer (A) being a block copolymer consisting of a block copolymer component (A-1) having a Tg of not lower than −30° C. and a block copolymer component (A-2) having a Tg of not higher than −40° C., said block copolymer having a bound styrene content of 15-50% by weight, a vinyl bond content in a butadiene portion thereof of 20-70% and a weight average molecular weight (Mw) of 600,000-3,000,000 as measured by a gel permeation chromatography (GPC), at least 30% of which copolymer being coupled with a coupling agent having a 2-6 functionalities; and said low molecular weight butadiene polymer (b) being a polymer having a bound styrene content of 0-60% by weight, a vinyl bond content in a butadiene portion thereof of 20-70%, a glass transition temperature (Tg) of not lower than −45° C. as measured by means of a differential scanning calorimeter (DSC) and a weight average molecular weight (Mw) of 2,000-50,000.

2. The rubber composition according to claim 1, wherein said branched styrene-butadiene copolymer (A) has a weight average molecular weight (Mw) of 70,000-2,500,000 as measured by a gel permeation chromatography (GPC).

3. The rubber composition according to claim 1, wherein said branched styrene-butadiene copolymer (A) has a block copolymer component (A-1) at its terminal.

* * * * *